US006666772B1

United States Patent
Cheney et al.

(10) Patent No.: US 6,666,772 B1
(45) Date of Patent: Dec. 23, 2003

(54) AXIALLY COLLAPSIBLE DRIVESHAFT ASSEMBLY

(75) Inventors: Christopher C. Cheney, Bowling Green, OH (US); Daniel C. Perry, Temperance, MI (US); Gregg W. Schabel, Northwood, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/494,713

(22) Filed: Jan. 31, 2000

(51) Int. Cl.$^7$ ................................................ F16C 3/03
(52) U.S. Cl. ...................................... 464/183; 280/777
(58) Field of Search ................... 464/32, 183; 180/232; 280/777, 784; 74/492; 403/2; 188/371; 285/2, 288.2

(56) References Cited

U.S. PATENT DOCUMENTS

| | | | | |
|---|---|---|---|---|
| 3,424,263 A | | 1/1969 | Black | |
| 3,504,567 A | * | 4/1970 | Ohashi et al. | 188/371 X |
| 3,665,778 A | * | 5/1972 | Bohan et al. | 74/492 |
| 3,703,105 A | * | 11/1972 | Milton et al. | 74/492 |
| 3,795,410 A | * | 3/1974 | Huber | 280/784 |
| 3,903,982 A | | 9/1975 | Van Winsen et al. | |
| 4,390,193 A | * | 6/1983 | Strahan et al. | 280/777 |
| 4,411,167 A | | 10/1983 | Mohr | |
| 5,336,013 A | * | 8/1994 | Duffy et al. | 403/2 |
| 5,566,777 A | | 10/1996 | Trommer et al. | |
| 5,685,565 A | * | 11/1997 | Schafer et al. | 74/492 X |
| 5,800,137 A | * | 9/1998 | Eitai et al. | 464/32 X |
| 6,189,941 B1 | * | 2/2001 | Nohr | 188/371 X |

FOREIGN PATENT DOCUMENTS

| | | | | |
|---|---|---|---|---|
| DE | 27 56 836 A1 | * | 6/1978 | 74/492 |
| JP | 3-10964 | * | 1/1991 | 280/777 |

* cited by examiner

*Primary Examiner*—Greg Binda
(74) *Attorney, Agent, or Firm*—MacMillan, Sobanski & Todd, LLC

(57) ABSTRACT

An axially collapsible driveshaft includes a first driveshaft tube section, a connecting member having a first end portion that is secured to the first driveshaft tube section, and a second driveshaft tube that is secured to a second end portion of the connecting member. During normal operation of the drive train assembly, torque is transmitted through the driveshaft by means of the securement between the first driveshaft tube section, the connecting member, and the second driveshaft tube section. However, if a relatively large axial force is applied to the end portions of the driveshaft, either or both of the end portions of the connecting member are designed to fracture, allowing relative axial movement to occur between the first driveshaft tube section and the second driveshaft tube section. An annular recess may be formed in the connecting member adjacent to either or both of the end portions that are secured to the driveshaft tube sections. Such a recess can be provided to weaken that end of the connecting member to insure that the fracture occurs reliably at the same location when a predetermined axial force is applied to the end portions of the driveshaft.

13 Claims, 2 Drawing Sheets

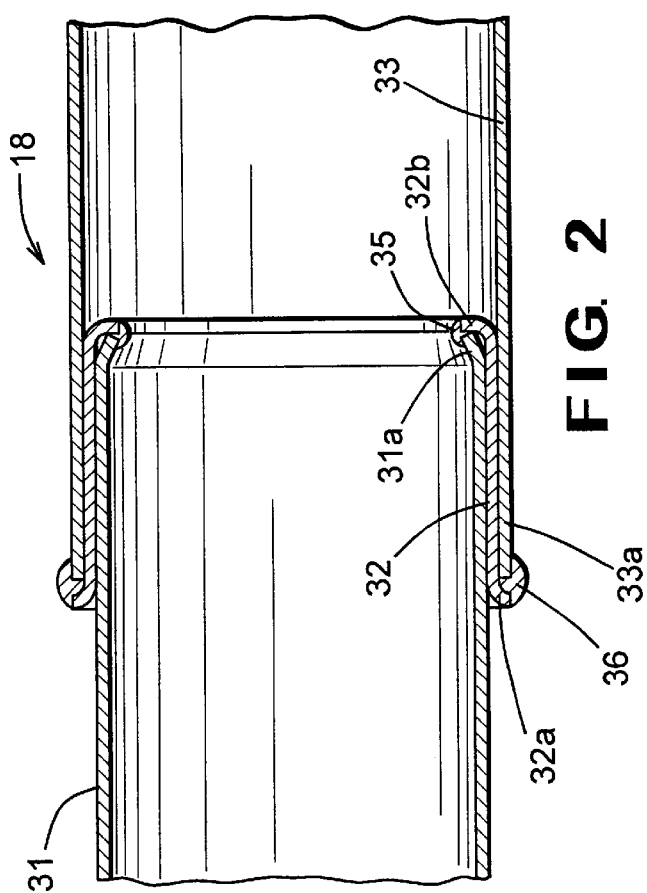
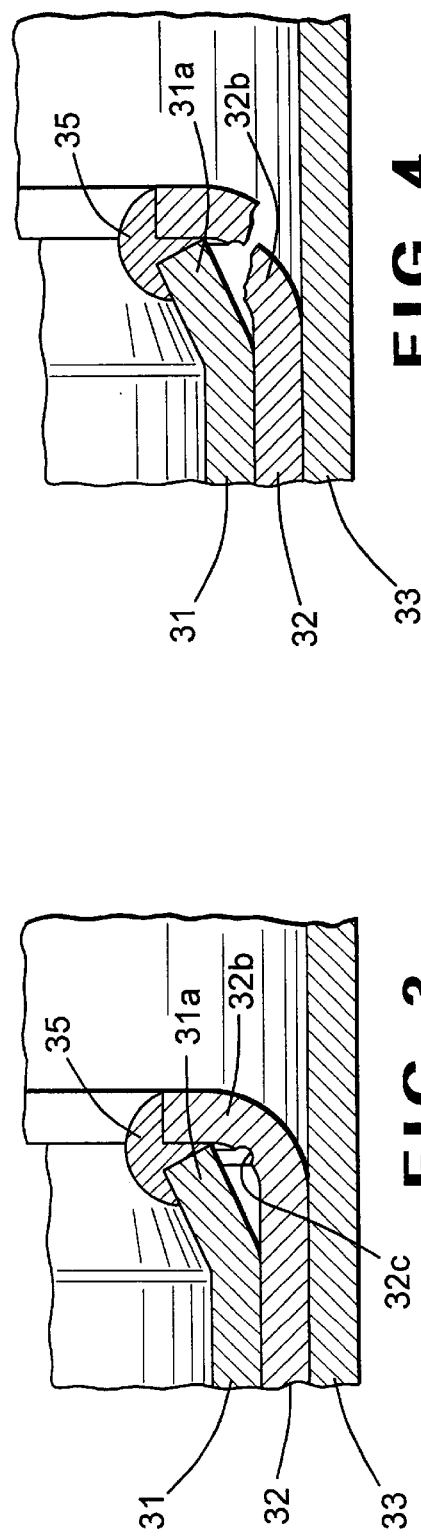

AXIALLY COLLAPSIBLE DRIVESHAFT ASSEMBLY

BACKGROUND OF THE INVENTION

This invention relates in general to drive train systems for transferring rotational power from a source of rotational power to a rotatably driven mechanism. In particular, this invention relates to an improved driveshaft assembly for use in such a drive train system that is axially collapsible in the event of a collision to absorb energy.

Torque transmitting shafts are widely used for transferring rotational power from a source of rotational power to a rotatably driven mechanism. For example, in most land vehicles in use today, a drive train system is provided for transmitting rotational power from an output shaft of an engine/transmission assembly to an input shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train systems of vehicles so as to be axially collapsible so as to absorb energy during a collision. To accomplish this, the driveshaft tube may be formed as an assembly of first and second driveshaft sections that are connected together for concurrent rotational movement during normal operation, yet which are capable of moving axially relative to one another when a relatively large axially compressive force is applied thereto, such as can occur during a collision. A variety of such axially collapsible driveshaft assemblies are known in the art.

It has been found to be desirable to design axially collapsible driveshaft assemblies of this general type such that a predetermined amount of force is required to initiate the relative axial movement between the two driveshaft sections. It has further been found to be desirable to design these axially collapsible driveshaft assemblies such that a predetermined amount of force (constant in some instances, varying in others) is required to maintain the relative axial movement between the two driveshaft sections. However, it has been found that the manufacture of such axially collapsible driveshaft assemblies is somewhat difficult and expensive to manufacture than convention non-collapsible driveshafts. Thus, it would be desirable to provide an improved driveshaft assembly for use in a vehicular drive train system that is axially collapsible in the event of a collision to absorb energy and that is relatively simple and inexpensive in structure.

SUMMARY OF THE INVENTION

This invention relates to a driveshaft for use in a vehicular drive train system that is axially collapsible in the event of a collision to absorb energy and that is relatively simple and inexpensive in structure. The driveshaft includes a first driveshaft tube section that is generally hollow and cylindrical in shape. The driveshaft also includes a connecting member that is generally hollow and cylindrical in shape and that axially overlaps a portion of the first driveshaft tube section. A first end portion of the connecting member is secured to the first driveshaft tube section, such as by welding, adhesive, and the like. The driveshaft further includes a second driveshaft tube section that is generally hollow and cylindrical in shape and that axially overlaps a portion of the connecting member. A second end portion of the connecting member is secured to the second driveshaft tube section, such as by welding, adhesive, and the like. During normal operation of the drive train assembly, torque is transmitted through the driveshaft by means of the securement between the first driveshaft tube section, the connecting member, and the second driveshaft tube section. However, if a relatively large axial force is applied to the end portions of the driveshaft, either or both of the end portions of the connecting member are designed to fracture, allowing relative axial movement to occur between the first driveshaft tube section and the second driveshaft tube section. This collapsing functions to absorb energy during a collision, thereby providing additional safety to the occupants of the vehicle. An annular recess may be formed in the connecting member adjacent to either or both of the end portions that are secured to the driveshaft tube sections. Such a recess can be provided to weaken that end of the connecting member to insure that the fracture occurs reliably at the same location when a predetermined axial force is applied to the end portions of the driveshaft.

Various objects and advantages of this invention will become apparent to those skilled in the art from the following detailed description of the preferred embodiment, is when read in light of the accompanying drawings.

BRIEF DESCRIPTION OF THE DRAWINGS

FIG. 2 is an enlarged sectional elevational view of a portion of the axially collapsible driveshaft illustrated in FIG. 1.

FIG. 3 is a further enlarged sectional elevational view of a portion of the axially collapsible driveshaft illustrated in FIG. 2.

FIG. 4 is an enlarged sectional elevational view similar to FIG. 3 showing the driveshaft after being axially collapsed.

DETAILED DESCRIPTION OF THE PREFERRED EMBODIMENT

Figure 1:
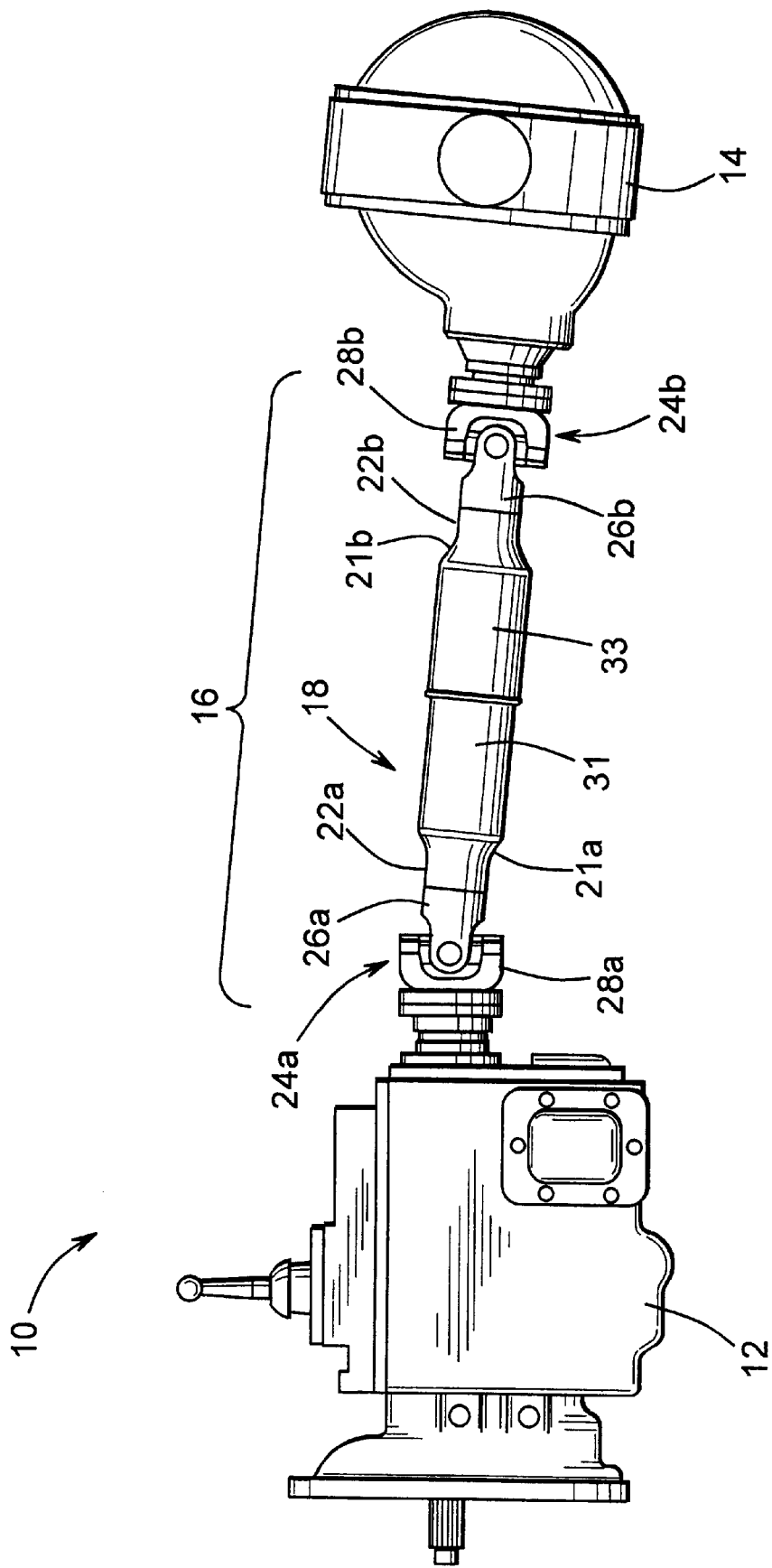
FIG. 1 is a schematic elevational view of a vehicle drive train assembly including an axially collapsible driveshaft in accordance with this invention.

Referring now to the drawings, there is illustrated in FIG. 1 a vehicular drive train assembly, indicated generally at 10, in accordance with this invention. The drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a generally hollow and cylindrical driveshaft, indicated generally at 18, having a center portion extending between a pair of opposed end portions 22a and 22b. In the illustrated embodiment, the center portion of the driveshaft 18 is formed having a larger outer diameter than either of the end portions 22a and 22b.

Thus, respective transition regions 21a and 21b are defined between the larger diameter center portion of the illustrated driveshaft 18 and each of the smaller diameter end portions 22a and 22b thereof. However, the driveshaft 18 may be formed having a constant diameter throughout the length thereof or any other desired shape. Alternatively, the single driveshaft 18 may be replaced by a compound driveshaft assembly (not shown) having separate first and second driveshaft sections that are supported by a center bearing assembly between the transmission 12 and the axle assembly 14. The driveshaft 18 can be formed from any suitable material, such as a lightweight aluminum alloy (6061 alloy, for example).

The output shaft of the transmission 12 and the input shaft of the axle assembly 14 are typically not co-axially aligned for rotation. To accommodate this, a pair of universal joints, indicated generally at 24a and 24b, are provided at the end portions 22a and 22b of the driveshaft 18 to respectively connect the driveshaft 18 to the output shaft of the transmission 12 and to the input shaft of the axle assembly 14. The first universal joint 24a includes a first yoke, such as a tube yoke 26a, that is secured to the front end portion 22a of the driveshaft 18 by any conventional means, such as by welding or adhesives. The first universal joint 24a further includes a second yoke, such as a half round end yoke 28a, that is connected to the output shaft of the transmission 12. Similarly, the second universal joint 24b includes a first yoke, such as a tube yoke 26b, that is secured to the rear end portion 22b of the driveshaft 18 by any conventional means, such as by welding or adhesives. The second universal joint 24b further includes a second yoke, such as a half round end yoke 28b, that is connected to the input shaft of the axle assembly 14.

Referring now to FIGS. 2 and 3, the structure of the driveshaft 18 is illustrated in detail. As shown therein, the driveshaft 18 includes a first driveshaft tube section 31 that is generally hollow and cylindrical in shape. The first driveshaft tube section 31 extends rearwardly from the front end portion 22a of the driveshaft 18 to a rear end portion 31a. The rear end portion 31a of the first driveshaft tube section 31 may be formed having any desired shape. In the illustrated embodiment, the terminal end of the rear end portion 31a of the first driveshaft tube section 31 is formed having a frusto-conical shape that tapers radially inwardly. The purpose for forming the rear end portion 31a of the first driveshaft tube section 31 with this frusto-conical shape will be explained below.

The driveshaft 18 further includes a connecting member 32 that is also generally hollow and cylindrical in shape. The connecting member 32 extends from a front end portion 32a to a rear end portion 32b. As shown in FIG. 2, the front end portion 32a of the connecting member 32 is curved radially outwardly, while the rear end portion 32b is curved radially inwardly. However, the front and rear end portions 32a and 32b, respectively, may be formed having any desired shapes. If desired, an annular recess 32c may be formed in the connecting member 32 adjacent to the inwardly curved rear end portion 32b thereof, as shown in FIG. 3, for a purpose that will be explained below. The inner diameter of the connecting member 32 is slightly larger than the outer diameter of the first driveshaft tube section 31. Thus, the connecting member 32 can be inserted telescopically about the rear end portion 31a of the first driveshaft tube section 31 in a press fit relationship. As best shown in FIG. 2, the rear end portion 31a of the first driveshaft tube section 31 can be disposed in abutment with or adjacent to the inwardly curved rear end portion 32b of the connecting member 32. If desired, the inwardly curved rear end portion 32b of the connecting member 32 can function as a positive stop for engagement by the rear end portion 31a of the first driveshaft tube section 31 during assembly. The inwardly curved rear end portion 32b of the connecting member 32 is then secured to the rear end portion 31a of the first driveshaft tube section 31, such as by a weld 35. However, the inwardly curved rear end portion 32b of the connecting member 32 can be secured to the rear end portion 31a of the first driveshaft tube section 31 by any other known means, such as by adhesives and the like.

Lastly, the driveshaft 18 includes a second driveshaft tube section 33 that is also generally hollow and cylindrical in shape. The second driveshaft tube section 33 extends rearwardly from a front end portion 33a to the rear end portion of the driveshaft 18. In the illustrated embodiment, the front end portion 33a of the second driveshaft tube section 33 is formed having a cylindrical shape. However, the front end portion 33a of the second driveshaft tube section 33 may be formed having any desired shape. The inner diameter of the second driveshaft section 33 is slightly larger than the outer diameter of the connecting member 32. Thus, the front end portion 33a of the second driveshaft section 33 can be inserted telescopically about the connecting member 32 in a press fit relationship. As best shown in FIG. 2, the front end portion 33a of the second driveshaft tube section 33 can be disposed in abutment with or adjacent to the outwardly curved front end portion 32a of the connecting member 32. If desired, the outwardly curved front end portion 32a of the connecting member 32 can function as a positive stop for engagement by the front end portion 33a of the second driveshaft tube section 33 during assembly. The outwardly curved front end portion 32a of the connecting member 32 is then secured to the front end portion 33a of the second driveshaft tube section 33, such as by a weld 36. However, the outwardly curved front end portion 32a of the connecting member 32 can be secured to the front end portion 33a of the second driveshaft tube section 33 by any other known means, such as by adhesives and the like.

During normal operation of the drive train assembly 10, torque is transmitted from the transmission 12 through the driveshaft assembly 16 to the axle assembly 14. As discussed above, the front end portion 22a of the first driveshaft tube section 31 is connected to the output shaft of the transmission 12 by the first universal joint 24a. The rear end portion 31a of the first driveshaft tube section 3 1 is connected to the rear end portion 32b of the connecting member 32 by the weld 35. The front end portion 32a of the connecting member 32 is connected to the front end portion 33a of the second driveshaft tube section 33. Lastly, the rear end portion 22b of the second driveshaft tube section 33 is connected to the input shaft of the axle assembly 14 by the second universal joint 24b. During such normal operation of the drive train assembly 10, no relative axial movement occurs between the first driveshaft tube section 31, the connecting member 32, and the second driveshaft tube section 33.

However, if a relatively large axial force is applied to the front and rear end portions 22a and 22b of the driveshaft 18, one or more portions of the connecting member 32 are designed to fracture, allowing relative axial movement to occur between the first driveshaft tube section 31a nd the second driveshaft tube section 33. This situation is shown in FIG. 4, wherein the rear end portion 32b has been fractured from the remainder of the connecting member 32. Accordingly, the overall length of the driveshaft 18 collapses or axially shortens, thereby absorbing energy during this process. Typically, the axial forces that are generated during a front-end impact of the vehicle with another object are sufficiently large as to cause this collapse to occur. Such collapsing functions to absorb energy during a collision, thereby providing additional safety to the occupants of the vehicle.

As mentioned above, an annular recess 32c is optionally formed in the connecting member 32 adjacent to the inwardly curved rear end portion 32b thereof. Such recess 32c can be provided to weaken that portion of the connecting member 32, thus insuring that the fracture will occur at that location when a relatively large axial force is applied to the front and rear end portions 22a and 22b of the driveshaft 18. This may be desirable to insure that such fracture occurs reliably at the same location when a predetermined axial force is applied to the front and rear end portions 22a and 22b of the driveshaft 18. In the illustrated embodiment, the recess 32c has a generally semi-circular cross sectional shape and extends continuously about the circumference of the connecting member 32. However, it is contemplated that the recess 32 may be formed having any desired shape and may, if desired, extend in a discontinuous manner about the circumference of the connecting member 32. Alternatively, one or more portions of the recess 32c may extend completely through the connecting member 32 adjacent to the inwardly curved rear end portion 32b thereof, similar to a knock-out plate provided on a conventional electrical enclosure.

As also mentioned above, the rear end portion 31a of the first driveshaft tube section 31 is formed having a frusto-conical shape that tapers radially inwardly. During a collision, this frusto-conical shape will cause the rear end portion 31a of the first driveshaft tube section 31 to exert not only an axially-directed force against the rear end portion 32b of the connecting member 32, but also a radially-inwardly directed force against such rear end portion 32b of the connecting member 32. The simultaneous exertion of such forces against the rear end portion 32b of the connecting member 32 can facilitate the generation of the fracture in the desired location, particularly when used in conjunction with the recess 32c.

In the illustrated embodiment, the rear end portion 32b of the connecting member 32 has been designed to fracture during a collision to permit relative axial movement to occur between the first and second driveshaft tube sections 31 and 33. However, it will be appreciated that the front end portion 32a of the connecting member 32 may be designed to fracture simultaneously with, or in lieu of, the rear end portion 32b of the connecting member 32. The amount of the axial force that is required to be applied to the front and rear end portions 22a and 22b of the driveshaft 18 to cause this collapsing movement can be adjusted as desired by varying the thickness and shape of the rear end 32b of the connecting member 32, the size and shape of the recess 32c, and the angle of the frusto-conical portion of the rear end portion 31a of the first driveshaft tube section 31.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft for use in a drive train assembly comprising:

a first driveshaft tube section having a hollow end portion;

a second driveshaft tube section having a hollow end portion; and a hollow connecting member formed from a separate piece of material from said first driveshaft tube section and said second driveshaft tube section, said hollow connecting member being disposed between said hollow end portion of said first driveshaft tube section and said hollow end portion of said second driveshaft tube section, said hollow connecting member having a first inwardly extending end portion and a second outwardly extending end portion, said first inwardly extending end portion of said connecting member being secured to said end portion of said first driveshaft tube section, said second outwardly extending end portion of said connecting member being secured to said end portion of said second driveshaft tube section.

2. The driveshaft defined in claim 1 wherein said first end portion of said connecting member is disposed telescopically about said end portion of said first driveshaft tube section.

3. The driveshaft defined in claim 2 wherein said end portion of said second driveshaft tube section is disposed telescopically about said second end portion of said connecting member.

4. The driveshaft defined in claim 1 wherein said first end portion of said connecting member is curved, and wherein said end portion of said first driveshaft tube section abuts said curved first end portion of said connecting member.

5. The driveshaft defined in claim 1 wherein said second end portion of said connecting member is curved, and wherein said end portion of said second driveshaft tube section abuts said curved second end portion of said connecting member.

6. The driveshaft defined in claim 1 wherein said first end portion of said connecting member is curved, and said end portion of said first driveshaft tube section abuts said curved first end portion of said connecting member, and further wherein said second end portion of said connecting member is curved, and said end portion of said second driveshaft tube section abuts said curved second end portion of said connecting member.

7. The driveshaft defined in claim 1 wherein said end portion of said first driveshaft tube section is tapered.

8. The driveshaft defined in claim 7 wherein said tapered end portion of said first driveshaft tube section is frusto-conical in shape.

9. The driveshaft defined in claim 7 wherein said first end portion of said connecting member is curved, and wherein said tapered end portion of said first driveshaft tube section abuts said curved first end portion of said connecting member.

10. The driveshaft defined in claim 1 wherein a recess is formed in at least one of said first and second end portions of said connecting member.

11. The driveshaft defined in claim 1 wherein said first end portion of said connecting member is secured to said end portion of said first driveshaft tube section by welding.

12. The driveshaft defined in claim 1 wherein said second end portion of said connecting member is secured to said end portion of said second driveshaft tube section by welding.

13. The driveshaft defined in claim 1 wherein said first end portion of said connecting member is secured to said end portion of said first driveshaft tube section by welding, and wherein said second end portion of said connecting member is secured to said end portion of said second driveshaft tube section by welding.

* * * * *